Jan. 5, 1954 T. B. LOSEY 2,664,952
CASING PACKER CUP
Filed March 15, 1948 3 Sheets-Sheet 1
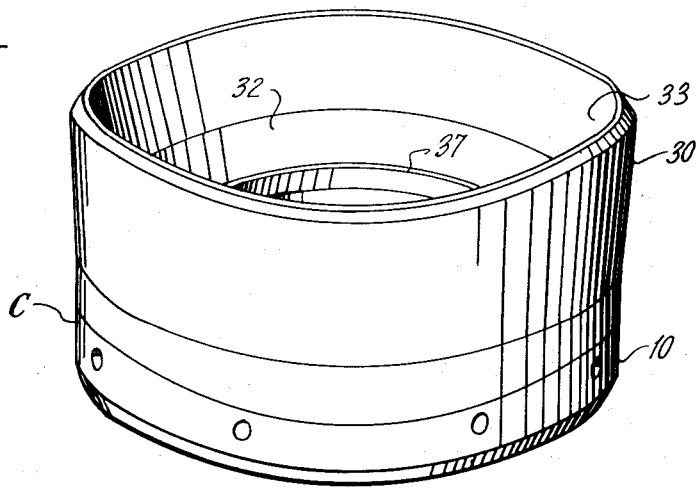
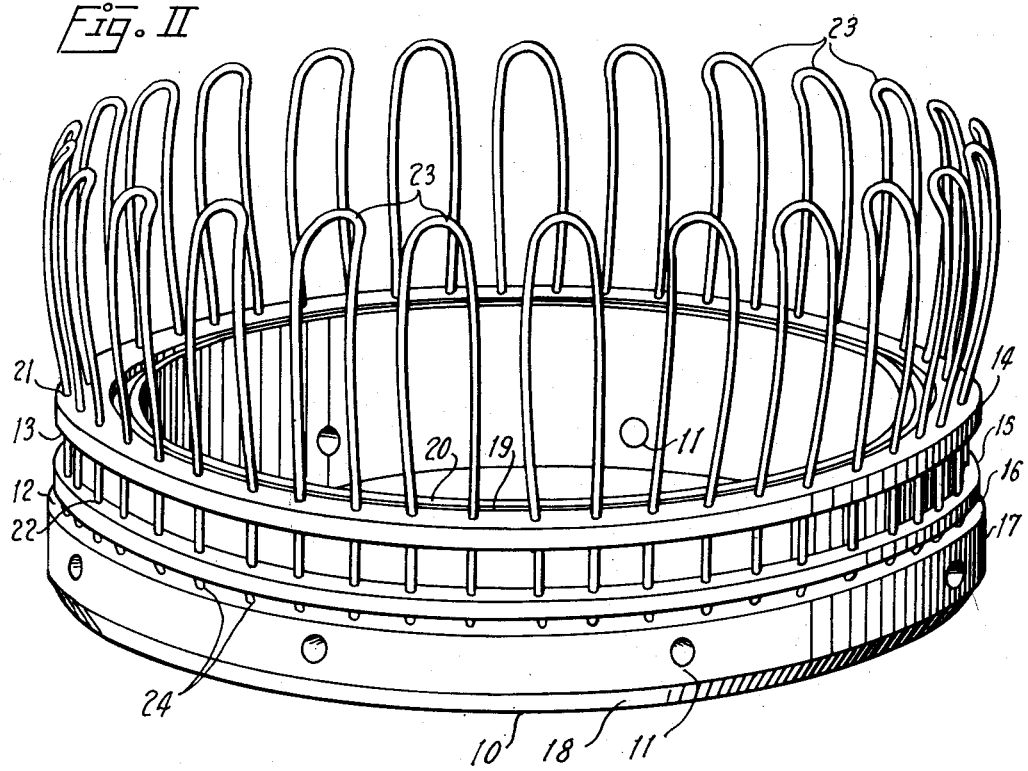
Inventor
Thomas B. Losey
By
Attorney

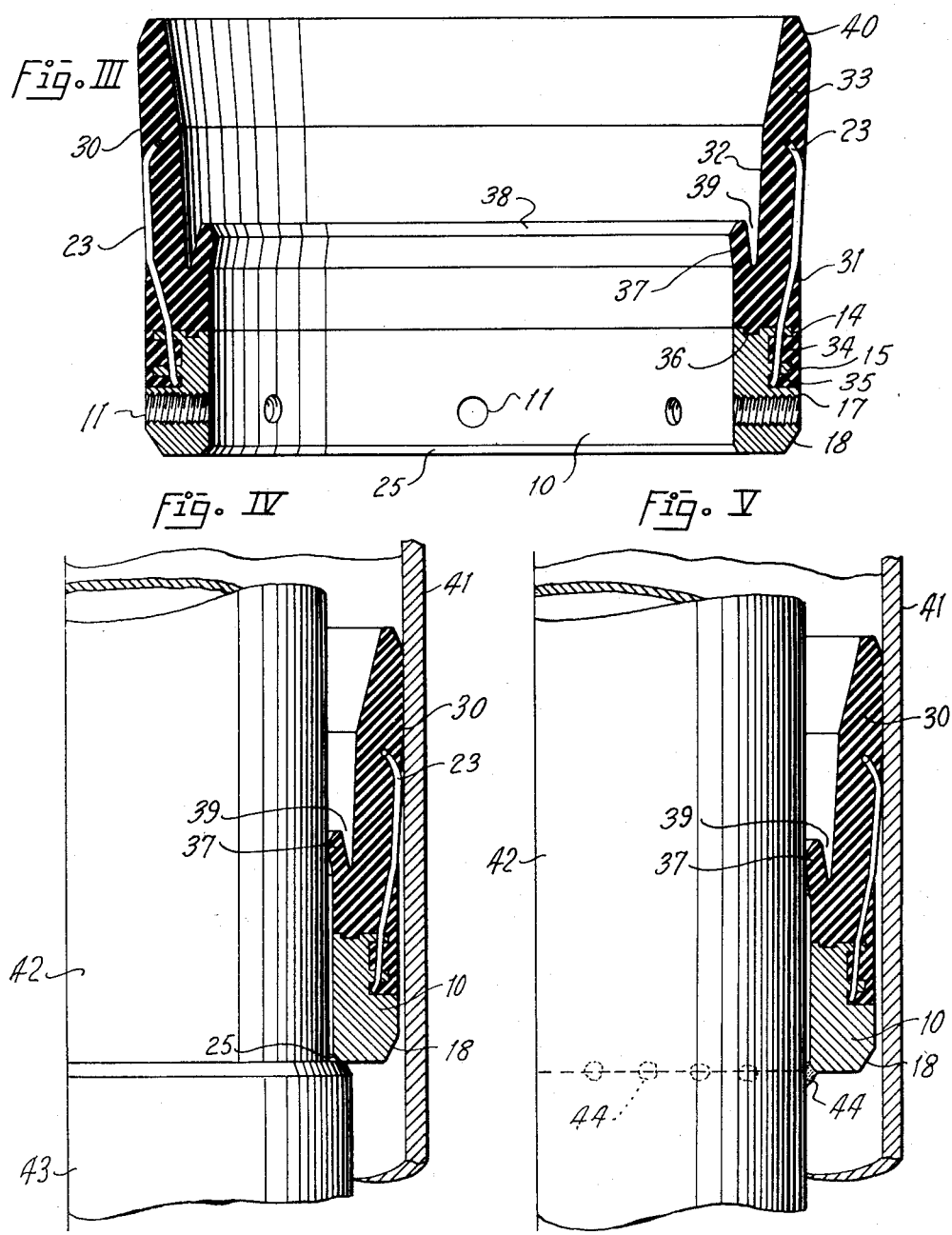

Jan. 5, 1954  T. B. LOSEY  2,664,952
CASING PACKER CUP
Filed March 15, 1948  3 Sheets-Sheet 3
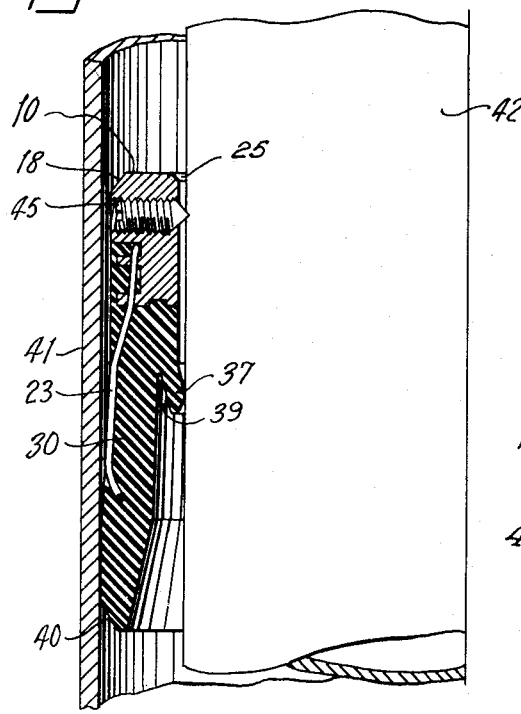
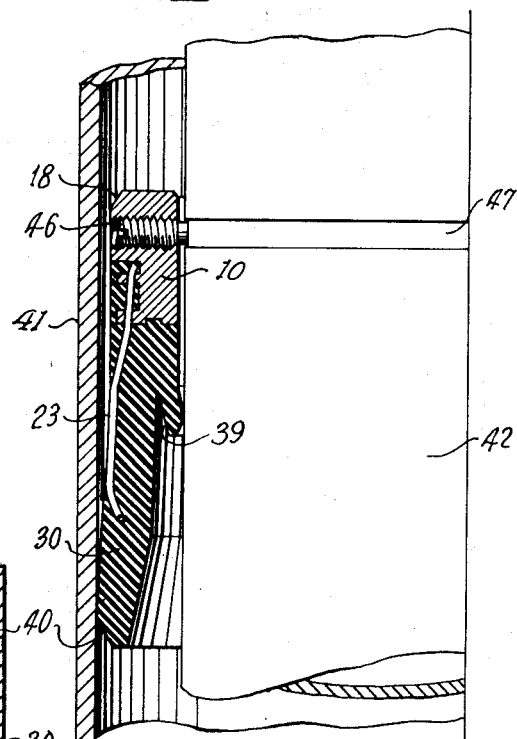
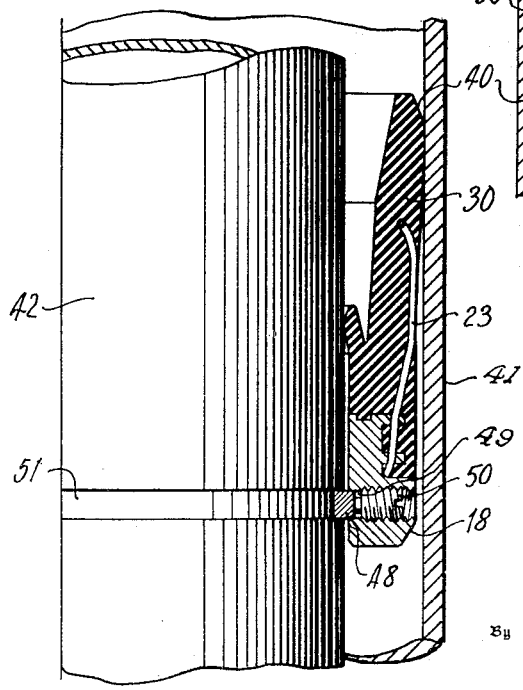
Inventor
Thomas B. Losey
By
Attorney Patented Jan. 5, 1954

2,664,952

UNITED STATES PATENT OFFICE 2,664,952

CASING PACKER CUP

Thomas B. Losey, Dallas, Tex., assignor to The Guiberson Corporation, Dallas, Tex., a corporation of Delaware Application March 15, 1948, Serial No. 14,850

2 Claims. (Cl. 166—10)

This invention has to do with packer cups for sealing off and retaining fluids within annular spaces in wells; and it is particularly useful in packing and sealing the annular space between two concentric pipes in an oil well, such as between a large casing and a smaller casing, or between a casing and a liner therein, or between other pipes so disposed.

Pipes placed within other pipes as casing in an oil well, are usually required to be of such nearly equal diameters as to leave only a very limited and narrow annular space therebetween; and such requirement and conditions give rise to very special problems in packing off fluids found between such pipes. The solutions of such problems present objectives of primary importance in the instant invention.

My packer cup, which I call a casing packer, notwithstanding that it may be used as an effective seal between any concentric strings of pipe, whether they be casing or not, is particularly effective and unusually useful in those operations providing what is generally known as "gravel packing" around liner screens. It is also unusually effective in the control of fluids in operations requiring the placement of cement back of liners, casing, tubing or other pipes. It is decidedly advantageous when used to protect low pressure producing sands or other formations, preventing their damage from higher fluid pressures arising in other strata or from other sources. Contamination of producing strata may be prevented with my packer, even though the annulus in which packing is required may be very small.

The closure of my packer element arises from the use of a pair of interrelated and cooperatively responding resilient lips which flex instantly into sealing contact with the tubular faces defining the annulus to be sealed; and such flexing is in immediate response to a pressure common to both such lips, being the pressure of the fluid retained and confined thereby.

A specially designed and integrally molded inside short lip is an important part of my invention. It effectively seals against fluids, the pressures of which are employed to force such lip against the inner casing. In the sealing operation this member takes the form of an elastic ring pressed against the outer surface of the inner casing; and no fluid may then flow along such surface.

Likewise, fluid may not flow along the inner walls of the outer casing, because of the yieldable nature of the thin upper section of the outer lip of the cup. This section is flared outwardly against such casing by the pressure of the fluid then contained by the packer.

When placed in sealing position by the pressures contained in the cup, the shorter and innermost lip thereof may be likened to the thumb of one's hand, and the outermost and longer lip thereof is then comparable to the index finger of the same hand, the space between roughly defining a V; and such space guides the impact of the pressure of the fluids and transmits impact and pressure to these flaring lips, and they are separated into a most effective sealing unit.

My device employs an unusually compact and strong base for receiving and holding elastic material thereon and thereabove, the base also providing simple and effective means for spacing most accurately the reinforcing ribs, wires or other materials employed in strengthening parts of the wall of the cup; and the whole base structure is such as to provide unusual and unique "keys" for receiving and maintaining and locking in inescapable position the elastic and resilient material which is extended upwardly to form the inner and outer lips of the cup.

It is to be noted that the following objects are important achievements of my invention.

(a) A unitary cup base in which there are no separate parts or members, to become disengaged.

(b) A complete packer cup is here provided with an unusually narrow wall (base included).

(c) A plurality of spaced vertically aligned, laterally extending flanges around the outer face of the base, with grooves between the flanges, through which flanges equidistantly spaced circumferentially disposed vertically aligned holes may be drilled to form supporting and engaging means for reinforcing ribs or wires or the like, and the lower free ends of the wires, in place, may be simply deflected, crimped or otherwise deformed, preventing their removal by accident or stress.

(d) A groove or key space of annular nature on the upper face of the base of the cup, so as to receive and have bonded therein resilient material forming part of the cup, thus greatly increasing its resistance to lateral or radial thrusts and stresses.

(e) The provision of two interconnected elastic and yielding lips of the cup, one within the other, the innermost being more elastic and shorter than the outermost, and the two being so arranged as to provide a V shaped space therebetween, in which to receive the pressure of fluids being retained by these resilient walls.

(f) Means for mounting the cup directly on a pipe or casing passing through it, without requiring any special mandrel.

(g) Means for attaching the cup to the inner casing supporting it, including the following: sharp pointed screws forcing a seat in the wall of the casing; a screw or screws made to enter a specially prepared groove in the outer wall of the casing; an expansible ring which may be made to move partly into a groove in the outer wall of the casing, and remain partly within a groove in the bore of the base of the cup; resting the base of the cup on the shoulder of any ordinary pipe coupling found on the inner casing string; and the further arrangement whereby the base of the cup may be welded to the pipe coupling or to the inner casing or to a short threaded piece or nipple thereof.

(h) Bonding the base and the reinforcing members together with the same resilient material used in making the flexible lips of the cup, particularly so bonding the legs of the reinforcements within a groove arranged around the outer face of the base of the cup, thus preventing the removal from the base of the reinforcing members and of the cup lips.

Many arrangements of my invention may be made, involving variants in construction and mechanics, without departing from the spirit and objects thereof. Typical forms of this invention appear in the drawings, which are offered by way of illustration but not in limitation, in which drawings:

Fig. I is a perspective view of a typical packer cup.

Fig. II is a perspective view of the carcass or skeleton of a cup, including the base.

Fig. III is a cross-sectional elevation of a typical packing cup, showing the thumb-like inner lip.

Fig. IV is a partial view in elevation of a pipe provided with a collar supporting a packing cup within a casing, parts of the cup and casing being shown in section.

Fig. V is a partially sectionalized elevation of a segment of a cup affixed to a pipe and held within the annular space between pipe and casing.

Fig. VI is a partially sectionalized elevation of half of a casing carrying therein an inverted cup pinned to a smaller pipe therein.

Fig. VII discloses the construction shown in Fig. VI, with the addition of a groove on the outer face of the smaller pipe, and dog nose screws used to attach the cup.

Fig. VIII discloses compressible split-ring attaching means between cup and pipe, employing complementary grooves and controlling screws.

A typical casing packer cup is set forth in the drawings, in which the completed cup is indicated as at C, in Fig. I. The parts of the device and associated mechanism are all indicated by numerals; and among these the numeral 10 indicates the base of a cup. It is in fact the base of the skeleton or carcass or framework of a cup also. See Fig. II. In practice this base may be made out of a single piece of circular steel, or other suitable material; and it may be fashioned or machined from a very short length of high grade tubular material; or it could be cast in the form approximating that indicated in the drawings, or in such form as will carry out the objectives of the invention.

It is usual to provide at least one groove, as at 12, entirely around the outer wall of the base, somewhere intermediate the top and bottom faces of the base. It is desirable that immediately above such groove, indicated as at 12, there be allowed sufficient stock of the material of the base to define a flange, such as that shown at 15; and the outer face of such flange should be of slightly less diameter than the outer face of the remaining and lowermost part of the base, as shown at 17. The base section 17 itself constitutes, in effect, a flange, but one of greater diameter than flange 15.

Base construction of this character will allow a shoulder or offset 16 to be found between the spaced flanges indicated. This is for the purpose of receiving within the groove 12, defined between said flanges, and on the shoulder 16, and entirely across the perimetrical face of flange 15, a continuing body of plastic material, so as to cause the bonding of such material in and to this base, its flanges, grooves and offsets. This bonding will also quite securely lock into position the legs of reinforcing wires, shown as at 23, and especially the free ends 24 thereof.

Carefully made and spaced holes 22 are disposed in substantially vertical position through the flange 15 or its equivalent. This arrangement will allow the introduction of reinforcing ribs 23 through the holes 22, which are spaced at predetermined and equal intervals. This will result in the reinforcing material 23 being equidistantly spaced around the base to form a skeleton of spring-like steel fingers (or other resilient reinforcing material of suitable nature).

Thus made there will be no variations in the extent of yielding of the flexible lips of the cup, which are formed of rubber, rubber composition or other resilient plastic material molded about and bonded to reinforcing elements and to the base.

The reinforcing members 23 (or wires of any suitable shape) may be mechanically secured in the base 10 by bending or deflecting the ends 24 thereof, or by so deforming them that they may not be withdrawn through holes 22. This will also anchor the walls of the cup to its base.

The rubber-like composition embedded around reinforcing ribs 23, and about the base, and in the grooves therein, and about the flanges thereof, will itself lock and tie the plastic material to the base, as well as lend shape, form and outline to the cup.

As described above, a suitable base can be made with but one groove, as at 12 (or even one groove as at 13) around its outer wall. However, it is considered more desirable to have a plurality of such grooves; and Fig. II shows one suitable form of construction incorporating this arrangement. In such constuction the grooves 12 and 13 are arranged around the outer face of the base 10, the former above the lowermost and widest flange 17. Groove 13 then becomes the space defined between the middle flange 15 and the uppermost flange 14 (whenever such a plurality of recesses and flanges are used).

Then, of course, the reinforcing members 23 may be bent intermediate their ends, by being deflected within groove 13, so as to firmly anchor such members.

In preparing the base, it is well to understand that where two or more flanges (as at 14 and 15) are used in addition to the lowermost and wider flange, as at 17, there is considerable saving in time and labor in the making of the holes 21 and 22 through the flanges 14 and 15, respectively. This is so because there is relatively little stock left in flanges 14 and 15 after groove 13 has been cut therebetween and groove 12 has been made. Drill bits quickly make the brief holes 21 and 22; and a series of drill bits, held in place by appropriate tools, can quickly drill the entire base at one operation.

After the base has been properly prepared, so as to provide a lowermost flange and one or more upper flanges spaced apart, and after suitable holes have been put through the upper flange or flanges, to receive the reinforcing members 23, then the next operation is to so bend or crimp or deform or deflect the ends 24 of the members 23 as to anchor them. This is an extremely simple, quick and efficient operation. It can be done with any tool which will deflect these ends sidewise, backwards, or forwards. Once these ends are turned (in any direction) the reinforcing members cannot be removed from such safe anchorage.

Of course, the reinforcing members 23 may be made longer or shorter as desired; and they may be made of stiffer or heavier material; and they may be made of lighter or more yielding and springy material, all as desired, considering fully the conditions under which any specific packer may be required to operate. Likewise, the spacings between the reinforcing members may be regulated to suit the size of the cup, and pressure and other conditions of operation.

To prevent the finished cup from hanging up on any obstructions within the outermost casing, the outer bevel 18 on the base is indicated; and to facilitate the fitting of the base of the cup around a pipe or casing, an inner bevel 25 is indicated. While these bevels are not essential to the operation of the device, it is considered good practice to incorporate them into the construction thereof.

It may well be observed here that there is the greatest ease and facility in sliding the finished cup onto a pipe or inner casing, about which it is to be carried, this being further facilitated by the smooth inner bore of the base itself, and the fact that the cup body is provided with a very limber and flexible internal thumb-like circular lip 37, which yields readily because of its resilient nature, and which, too, may be provided with inner bevel 38.

The production of the carcass of a cup, such as is exhibited in Fig. II, is a very quick operation, and inexpensive. In molding rubber composition about this carcass, the base itself forms part of the simple mold required. The mold will allow the adding of composition on shelf 16 and above flange 17, so as to finish the cup with a smooth and continuous upwardly flowing outer lip. The structure here presented will keep or return to its original shape, regardless of terrific pressures which may temporarily deform the cup.

The resilient nature of the rubber-like composition used to make the outer lip of the cup and the inner lip thereof, is, of course, implemented by the resilient nature of the spring-like reinforcing members 23. The packer made on such a skeleton as is shown in Fig. II is a tough product capable of containing great pressures, notwithstanding its quick response to relatively low pressures; and when all fluid pressure is relieved from the V-shaped aperture between the outer and inner lips of the cup, it will immediately and automatically release its seal and hold on the pipes, between which the cup is placed; and then the cup is easily removed.

The construction and disposition of the upper part of the finished cup is well disclosed in Fig. III, wherein the entire resilient outer lip of the cup is shown as at 30, and the lowermost part of this outer lip is indicated by the numeral 31. The section 31 is not only the thickest portion of this outer lip, but it is the strongest part thereof, being well reinforced by having the lower parts of the members 23 pass therethrough to their anchorage in rings 14 and/or 15, which are integral parts of the base 10, to which it is further keyed, fastened and embedded by the use of plastic belts 34 and 35.

The rubber composition is further bonded to base 10 by being forced into the groove 19 (which is protected on one side by rim 20 and on the other by flange 14) to form a band of resilient material 36, keying and tieing the lower part 31 of the lip 30 to the base, the better to prevent lateral and radial thrusts from permanently deforming the cup and from breaking the union between the cup lip and the cup base.

The middle section of the cup lip is shown as at 32, it being a lip of medium thickness, and more flexibility than is found in the lower lip section 31. The upper termini of reinforcing members 23 are found in the uppermost part of section 32 of the cup lip.

Above mid-section 31, there is an unreinforced and more pliable and more resilient section of the lip, of thinner character and more yieldable nature; and this top-section is indicated as at 33. Section 33 may be flared outwardly slightly and provided with a bevel on its upper outer edge, as at 40.

The construction indicated makes clear that there are three areas of varying pliability in the outer lip 30: (1) The thickened and heavily reinforced lower section 31; (2) the wall of medium thickness, having reinforcements therein shown, as at 32; and (3) the thinner, tapering, unreinforced and more pliable section 33.

Of much importance in the construction and operation of this packer cup is the inner lip 37, constituting a pliable inner rim of the cup, to fit snugly against the casing carrying the cup. Between the inner lip 37 and the outer lip section 32 there is defined a sealing recess 39, which is in effect an expansible pocket, into which fluids under pressure may force themselves, resulting in the spreading apart of the yielding inner lip member 37, and the more yieldable sections of the outer lip 30, and particularly the upper lip section thereof. The latter will move outwardly like a finger, and impinge and seal against the outer casing 41; while the inner lip member will bend backward, and fit very tightly against the inner casing 42. The more pressure that is exerted in pocket 39, the tighter the diverging lips of the cup will cling to their respective pipes or casings.

My cup is self-forming and self-fitting, operating to stop and seal whatever annular recess it is employed to close. It is automatic. That fact is of great importance in this invention. My packer does a quicker and more dependable job of sealing than devices which deform and compress and shorten some kind of material by putting a weight on it from above, or screwing it up from below, or releasing springs which push it outward, or sliding wedges through it. I have achieved a most simple and entirely dependable packing device. It has an extremely long life. It has the barest minimum of parts, none of which can get out of fix.

My packer cup is carried directly on the innermost of two concentric pipes, the annulus between which it closes and packs off. No special mounting mandrel or inner-tube or other space-consuming mounting device is employed within my cup. Such may be found in conventional packers. None is required in mine.

Every string of pipe is put together with some form of connecting joint; and the most commonplace of all is the ordinary pipe collar, such as is shown at 43 in Fig. IV. This figure is self-explanatory; and from a consideration of its disclosure, it becomes evident that my packer cup can be made to rest upon the upper shoulder or rim of the ordinary pipe coupling. This is a very simple and satisfactory way of supporting and carrying my packer, especially when it is required to seal off against the fluids thereabove. Whenever my packer cup is to be turned upwardly (as shown in Fig. IV), and when the exact location of it is not of such importance that it may not be placed on some convenient pipe coupling on a string of pipe, then this form of support and method of locating the packer is recommended.

Release of pressure beyond the sealing end of the packer, or the drawing off of fluid in such region, will allow the packer to be easily withdrawn from the outer casing 41 by merely lifting up the string of pipe, one length of which is indicated as at 42.

Whenever it is required that my packer cup be located exactly at a fixed level in the well (and such level will preclude the use of a pipe collar for a resting place for the cup), then the manner of attachment shown in Fig. V can well be employed. The method of attachment there shown is equally good where the cup operates in an upright position or in an inverted position, because the cup is securely fastened to the face of inner casing 42, in this instance through the use of welding (which may be of any kind, including the spot welding shown as at 44).

In Fig. VI there is shown a further method of attaching the packer cup. This method is extremely simple, but quite effective; and it can be used when the cup is in upright position or when it is upside-down. A series of holes 11 is usually provided around the base of the standard cup, anyway; and these holes should be threaded, so as to receive set screws, of some suitable character. The screw shown in Fig. VI, as at 45, is a sharp-nosed screw, which (when well made up) will make and force its own seat in the outer face of casing 42. Obviously, with this sharp nosed screw arrangement, my packer cup can be located anywhere along the face of any pipe; and it can be kept there in absolute safety and security, regardless of the pressures it may be required to stand.

A little more elaborate form of attachment is shown in Fig. VII, wherein there is provided around the outer face of casing 42 a groove 47, designed to receive the ends of set screws 46, which are operated through threaded holes 11 in the base of the cup. The screw 46, having a blunt nose designed to fit into the groove 47, is commonly known as a dog-point screw; and such a screw will serve to lock the cup into any suitable horizontal groove around the face of the inner casing. Various other types of screws may be used for this purpose, as is obvious.

Where it is required that there be a mounting of my cup on an inner casing under such circumstances as will afford the greatest resistance to tremendous shearing force, then I recommend the mounting as shown in Fig. VIII, wherein a split snap ring 48 is normally carried completely and securely within the recess of a groove 49, provided around the inner face of the base 10 of my cup. Several holes 11 are provided through the wall of the base horizontally, in the usual way; and they are threaded. Any suitable screw, such as that shown at 50, can be made up into holes 11 until the spring steel snap ring 48 has been forced partly out of groove 49, and until it has been forced partly into groove 51, the latter being arranged around the outer face of casing 42. No pressures encountered in an oil well will ordinarily be sufficient to dislodge a cup when mounted so securely as that shown in Fig. VIII. When it is desired to unlock the cup from casing 42 the only operation necessary is to back off on the screws 50. The resilient nature of the split ring 48 is such that the ring will immediately find its customary lodgment in the groove 49, entirely out of the way of the face of casing 42, and especially out of groove 51 thereon. Then the cup can be slipped along the face of the casing at pleasure, and removed therefrom.

In come of the illustrations used to show various ways of mounting my cup, I have disclosed the cup in an inverted position, notably in Figs. VI and VII. This is done to indicate that the cup may be used in that position, whenever desired. Likewise, in some of these illustrations I have shown the cup to be upright. Such is disclosed in Figs. IV, V and VIII. It may be used either way.

A single inverted cup can be used to force fluids (such as cement slurry, or other) out of a casing by lowering within it a pipe equipped with one of my cups of proper size.

If the cup be fitted upright around the central pipe, then it will act very effectively as a swab to lift fluids out of the surrounding or larger pipe when the inner pipe is lifted.

I claim:

1. In a well packer, a cylindrical base, including a plurality of flanges extending laterally therefrom and being spaced apart to provide grooves therebetween, the lowermost flange of which having a greater external diameter than that of the uppermost two flanges, and the uppermost two flanges being provided with a series of holes therethrough; reinforcing members carried in said holes and extending upwardly above the base; and a resilient cup molded about and extending above the base and anchored thereto by being also molded about said uppermost two flanges, the cup being provided with a comparatively long outer lip arranged about said reinforcing members and extending thereabove, the cup being also provided with a relatively short inner lip, and the lowermost parts of both lips converging downwardly until united, the two lips being so spaced apart as to define an annular pocket therebetween.

2. In a well packer, a cylindrical base, including a plurality of flanges extending laterally therefrom and spaced apart to provide grooves therebetween, the lowermost flange having an external diameter greater than that of the uppermost two flanges, and the uppermost flanges being provided with a series of apertures; reinforcing members arranged in said apertures and extending upwardly above the base; an annular groove provided on the upper face of the base; and a resilient cup molded about and extending above said base, the cup being so formed as to cause the flow and bonding of the resilient material into said annular groove on the upper face of the base and into the groove between said uppermost two flanges, the cup being provided with a comparatively long outer lip arranged about said reinforcing members, and the cup being further provided with a relatively short inner lip, the lowermost part of which and the lowermost part of said longer outer lip converging, so as to form an annular recess between said lips.

THOMAS B. LOSEY.

References Cited in the file of this patent

UNITED STATES PATENTS

| Number | Name | Date |
|---|---|---|
| 63,747 | Petty et al. | Apr. 9, 1867 |
| 746,184 | Smith et al. | Dec. 8, 1903 |
| 1,091,387 | Pierce | Mar. 24, 1914 |
| 1,613,066 | Turner | Jan. 4, 1927 |
| 1,734,236 | Smith et al. | Nov. 5, 1929 |
| 2,189,697 | Baker | Feb. 6, 1940 |
| 2,233,692 | Bryant | Mar. 4, 1941 |
| 2,305,282 | Taylor et al. | Dec. 15, 1942 |
| 2,325,556 | Taylor et al. | Jan. 27, 1943 |
| 2,360,577 | Parrish | Oct. 17, 1944 |
| 2,430,623 | Taylor et al. | Nov. 11, 1947 |